(12) United States Patent
Seo

(10) Patent No.: US 7,319,815 B2
(45) Date of Patent: Jan. 15, 2008

(54) STAGE APPARATUS AND CAMERA SHAKE CORRECTION APPARATUS USING THE SAME

(75) Inventor: Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 536 days.

(21) Appl. No.: 11/036,123

(22) Filed: Jan. 18, 2005

(65) Prior Publication Data
US 2005/0157287 A1 Jul. 21, 2005

(30) Foreign Application Priority Data
Jan. 21, 2004 (JP) ............................. 2004-013563

(51) Int. Cl.
*G03B 17/00* (2006.01)
*B23Q 1/62* (2006.01)

(52) U.S. Cl. .................... 396/55; 33/1 M; 359/554; 108/20; 108/143

(58) Field of Classification Search ............... 396/55; 348/208.7, 208.11; 359/554, 557, 813, 814; 33/1 M; 74/490.09; 108/20, 143
See application file for complete search history.

(56) References Cited
U.S. PATENT DOCUMENTS

| | | | | | |
|---|---|---|---|---|---|
| 4,171,657 | A | * | 10/1979 | Halberschmidt et al. ...... | 83/886 |
| 4,320,943 | A | * | 3/1982 | Link ........................... | 353/27 R |
| 4,995,277 | A | * | 2/1991 | Yanagisawa ............... | 74/490.09 |
| 5,748,391 | A | * | 5/1998 | Tanaka et al. ............... | 359/813 |
| 6,005,723 | A | * | 12/1999 | Kosaka et al. ............... | 359/822 |
| 6,909,560 | B2 | * | 6/2005 | Lin et al. ...................... | 359/813 |
| 7,224,893 | B2 | * | 5/2007 | Uenaka ........................ | 396/55 |

FOREIGN PATENT DOCUMENTS

| | | |
|---|---|---|
| JP | 8-304868 | 11/1996 |
| JP | 2003-057707 | 2/2003 |

OTHER PUBLICATIONS

English Language Abstract of JP 2003-057707, Feb. 26, 2003.
U.S. Appl. No. 11/062,694 to Seo, filed Feb. 23, 2005.

* cited by examiner

*Primary Examiner*—W. B. Perkey
(74) *Attorney, Agent, or Firm*—Greenblum & Bernstein, P.L.C.

(57) ABSTRACT

A stage apparatus includes a stationary support base-plate; a Y-direction moving member supported on the stationary support base-plate to move in a Y-direction; and an X-direction moving member supported on the Y-direction moving member to move in an X-direction orthogonal to the Y-direction. The Y-direction moving member includes a Y-direction rod portion which extends in the Y-direction and an X-direction rod portion connected to the Y-direction rod portion and extends in the X-direction. The stationary support base-plate includes a Y-direction guide device for guiding the Y-direction rod portion of the Y-direction moving member so as to slide in the Y-direction, and a Y-direction support device for supporting a free end of the X-direction rod portion so as to allow movement of the X-direction rod portion in the Y-direction. The X-direction moving member is supported by the Y-direction moving member so as to slide in the X-direction.

11 Claims, 10 Drawing Sheets

STAGE APPARATUS AND CAMERA SHAKE CORRECTION APPARATUS USING THE SAME

BACKGROUND OF THE INVENTION

1. Field of the Invention

The present invention relates to a stage apparatus in which a stage plate is linearly moved in two orthogonal directions and a camera shake correction apparatus using the stage apparatus.

2. Description of the Related Art

For example, in Japanese Unexamined Patent Publication No. 08-304868, a stage apparatus in which a stage plate can be linearly moved in two orthogonal directions in a plane is used as a camera shake correction apparatus.

A known stage apparatus (camera shake correction apparatus) is constructed as follows.

A Y-direction guide member, which is provided on and projects from one side of a stationary support base-plate, is provided with a Y-direction through hole which linearly extends therethrough in a particular direction (which will be referred to hereinafter as a Y-direction). A Y-direction moving member made from an L-shaped rod member is relatively movably fitted at one arm thereof in the Y-direction hole, so that the linear movement of the Y-direction moving member in the Y-direction can be guided. A projection provided on a stage plate (X-direction moving member), to which a correction lens is secured, is provided with an X-direction through hole which linearly extends therethrough in an X-direction orthogonal to the Y-direction. The other arm of the Y-direction moving member is relatively movably fitted in the X-direction hole, so that the linear movement of the stage plate in the X-direction can be guided by the other arm. Moreover, the stage plate is supported at three points on the front and back side surfaces of the stage plate by a positioning member so that the stage plate can be always placed in an imaginary X-Y plane parallel with the X-direction and Y-direction.

When a linear moving force in the X-direction is applied to the stage plate, the stage plate is linearly moved in the X-direction in the imaginary X-Y plane along the other arm of the Y-direction moving member. When a linear moving force in the Y-direction is applied to the stage plate, one arm of the Y-direction moving member is linearly moved in the Y-direction in the imaginary X-Y plane along the Y-direction through-hole elongated in the Y-direction, so that the stage plate is linearly moved together in the Y-direction.

Consequently, the correction lens is moved in the X and Y directions by driving the actuator, based on oscillation information detected by an oscillation detecting sensor provided in the camera body to thereby correct camera shake.

However, in the stage apparatus disclosed in Japanese Unexamined Patent Publication No. 08-304868, it is necessary to provide a positioning member to support the stage plate at three points on the front and back side surfaces thereof, in addition to the stationary support base-plate, the Y-direction moving member and the stage plate (X-direction moving member), thus resulting in a complicated structure.

SUMMARY OF THE INVENTION

The present invention provides a stage apparatus in which a stage plate can be linearly moved in two orthogonal directions by a simple structure and a camera shake correction apparatus using the stage apparatus.

According to an aspect of the present invention, a stage apparatus is provided, including a stage apparatus, including a stationary support base-plate; a Y-direction moving member which is supported on the stationary support base-plate to move in a specific Y-direction; and an X-direction moving member which is supported on the Y-direction moving member so as to move in an X-direction orthogonal to the Y-direction. The Y-direction moving member includes a Y-direction rod portion which extends in the Y-direction and an X-direction rod portion which is connected to the Y-direction rod portion and extends in the X-direction. The stationary support base-plate includes a Y-direction guide device for guiding the Y-direction rod portion of the Y-direction moving member so as to slide in the Y-direction, and a Y-direction support device for supporting a free end of the X-direction rod portion so as to allow movement of the X-direction rod portion in the Y-direction. The X-direction moving member is supported by the Y-direction moving member so as to slide in the X-direction.

It is desirable for the Y-direction guide device to include a Y-direction guide hole to guide the Y-direction rod portion so as to slide in the Y-direction, the Y-direction support device including a Y-direction elongated hole in which the free end of the X-direction rod portion is supported to allow movement of the X-direction rod portion in the Y-direction and to prevent rotation of the X-direction rod portion about the Y-direction rod portion.

It is desirable for the Y-direction moving member to be provided with a pair of X-direction rod portions. The stationary support base-plate is provided with a pair of the Y-direction elongated holes in which the corresponding X-direction rod portions are supported. The X-direction moving member is supported by the X-direction rod portions so as to slide in the X-direction.

It is desirable for the X-direction moving member to include an X-direction guide hole in which one of the X-direction rod portions is linearly movably fitted, and a rotation prevention hole in which the other of the X-direction rod portions is fitted so as to relatively move in the X-direction and so as not to rotate about the one X-direction rod portion.

It is desirable for the length of the rotation prevention hole in the Y-direction to be longer than the length of the other X-direction rod portion in section in the Y-direction.

It is desirable for the Y-direction moving member to include a single X-direction rod portion, wherein the X-direction moving member is provided with an X-direction guide hole in which the X-direction rod portion is linearly movably fitted, and a rotation prevention hole in which the Y-direction rod portion is fitted so as to relatively move in the Y-direction and so as not to rotate about the one X-direction rod portion.

It is desirable for the length of the rotation prevention hole in the X-direction to be longer than the length of the Y-direction rod portion in section in the X-direction.

It is desirable for the Y-direction guide hole of the stationary support base-plate to include an opening portion in which the Y-direction rod portion is removably inserted from a direction perpendicular to the direction of an extension of the Y-direction rod portion, so that when the Y-direction rod portion is inserted in the Y-direction guide hole through the opening portion, the free end of the X-direction rod portion is fitted in the Y-direction elongated hole.

It is desirable for the stage apparatus to include a Y-direction actuator which drives the Y-direction moving member which carries thereon the X-direction moving member in the Y-direction, and an X-direction actuator which drives the X-direction moving member on the Y-direction moving member in the X-direction.

In an embodiment, a camera shake correction apparatus using a stage apparatus is provided, including a camera in which the stage apparatus is built; an image pickup device which is secured to a front surface of the X-direction moving member and which has an image pickup surface on an image forming surface of an optical system of the camera; an oscillation detection sensor which detects an oscillation of the camera; and a control device for driving the X-direction actuator and the Y-direction actuator to correct a camera shake, based on oscillation information detected by the oscillation detection sensor.

In an embodiment, a camera shake correction apparatus using a stage apparatus is provided, including a camera in which the stage apparatus is built; a camera shake correcting lens secured to the X-direction moving member and-located in front of the image pickup surface, the camera shake correcting lens being perpendicular to an optical axis of the optical system of the camera; an oscillation detection sensor which detects an oscillation of the camera; and a control device for driving the X-direction actuator or Y-direction actuator to correct a camera shake, based on oscillation information detected by the oscillation detection sensor.

The present disclosure relates to subject matter contained in Japanese Patent Application No. 2004-13563 (filed on Jan. 21, 2004) which is expressly incorporated herein in its entirety.

DESCRIPTION OF THE EMBODIMENTS

Embodiments of the present invention will be discussed below with reference to the accompanying drawings.

Figure 1:
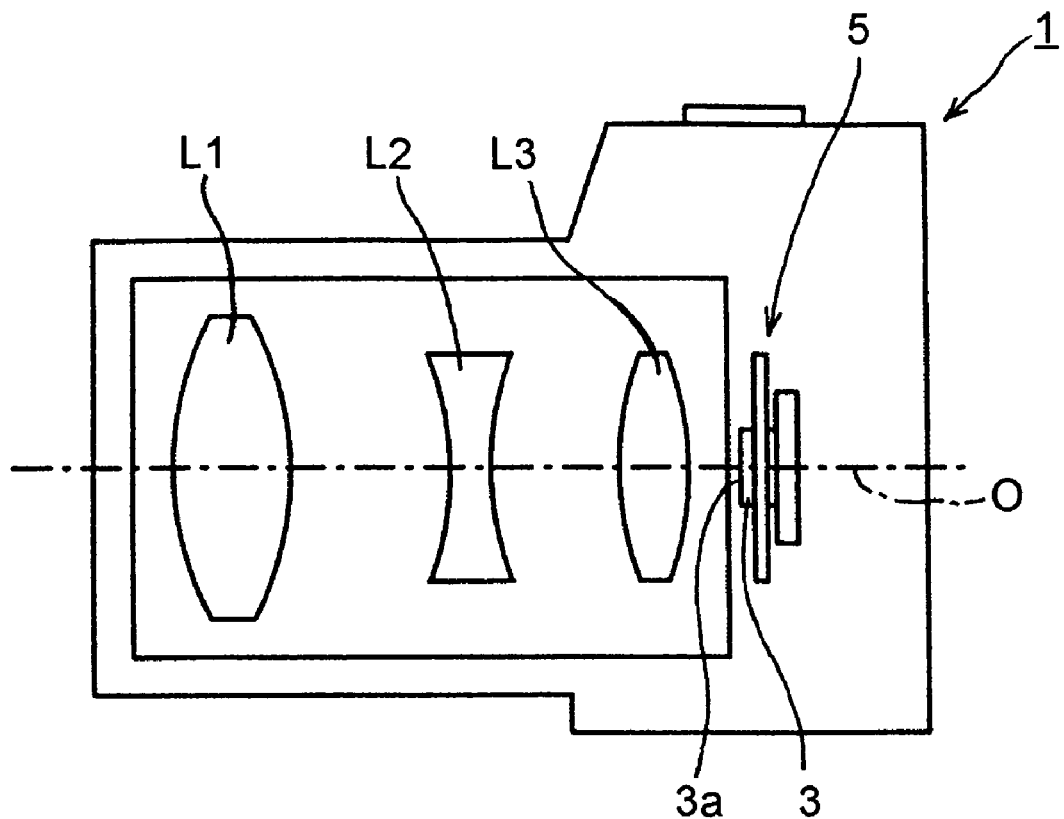
FIG. 1 is a longitudinal sectional side view of a digital camera having a camera shake correction apparatus according to a first embodiment of the present invention.

As can be seen in FIG. 1, a camera optical system having a plurality of lenses L1, L2 and L3 is provided in a digital camera 1. A CCD (image pickup device) 3 is provided behind the lens L3. The CCD 3 has an image pickup surface (image forming surface) 3a which lies in a plane perpendicular to the optical axis O of the optical system and is secured to a camera shake correction apparatus 5 incorporated in the digital camera 1.

The camera shake correction apparatus 5 is constructed as shown in FIGS. 2 through 10.

Figure 7:
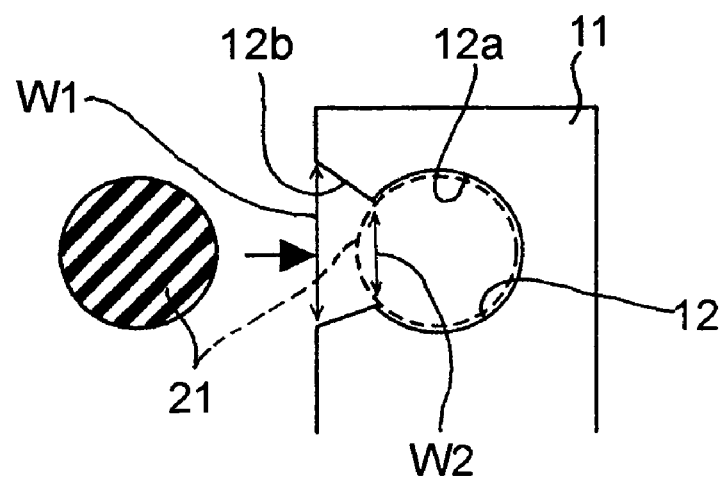
FIG. 7 is a sectional view taken along the line VII-VII in FIG. 6, showing a Y-direction moving member fitted in a guide portion of a Y-direction elongated hole.
Figure 2:
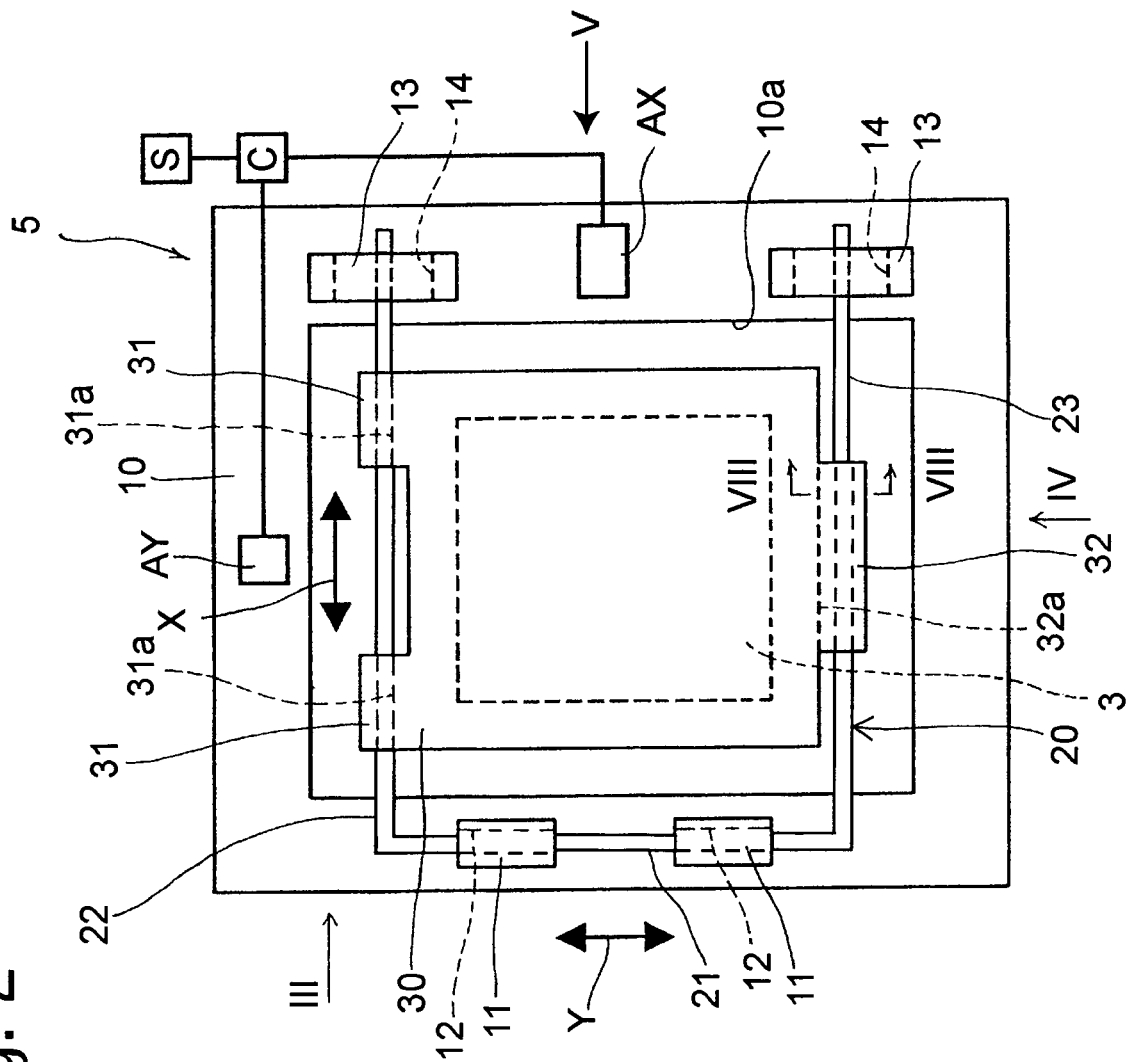
FIG. 2 is a back view of a camera shake correction apparatus in an inoperative position.
Figure 3:
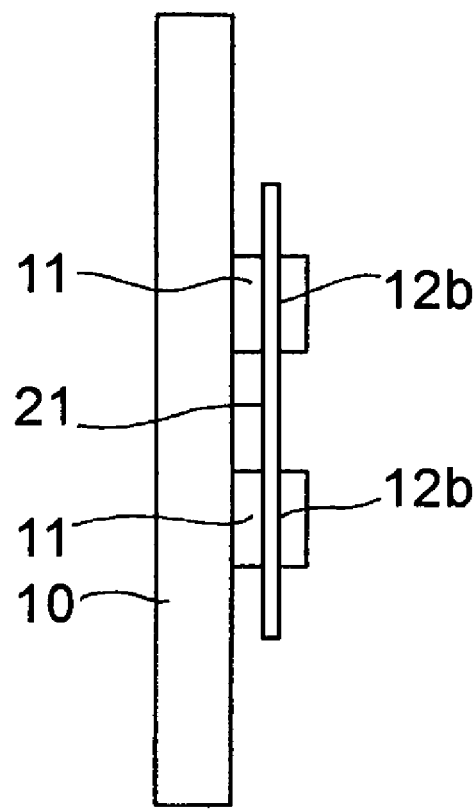
FIG. 3 is a side view of a camera shake correction apparatus with a removed stage apparatus, viewed from a direction indicated by an arrow III in FIG. 2.
Figure 6:
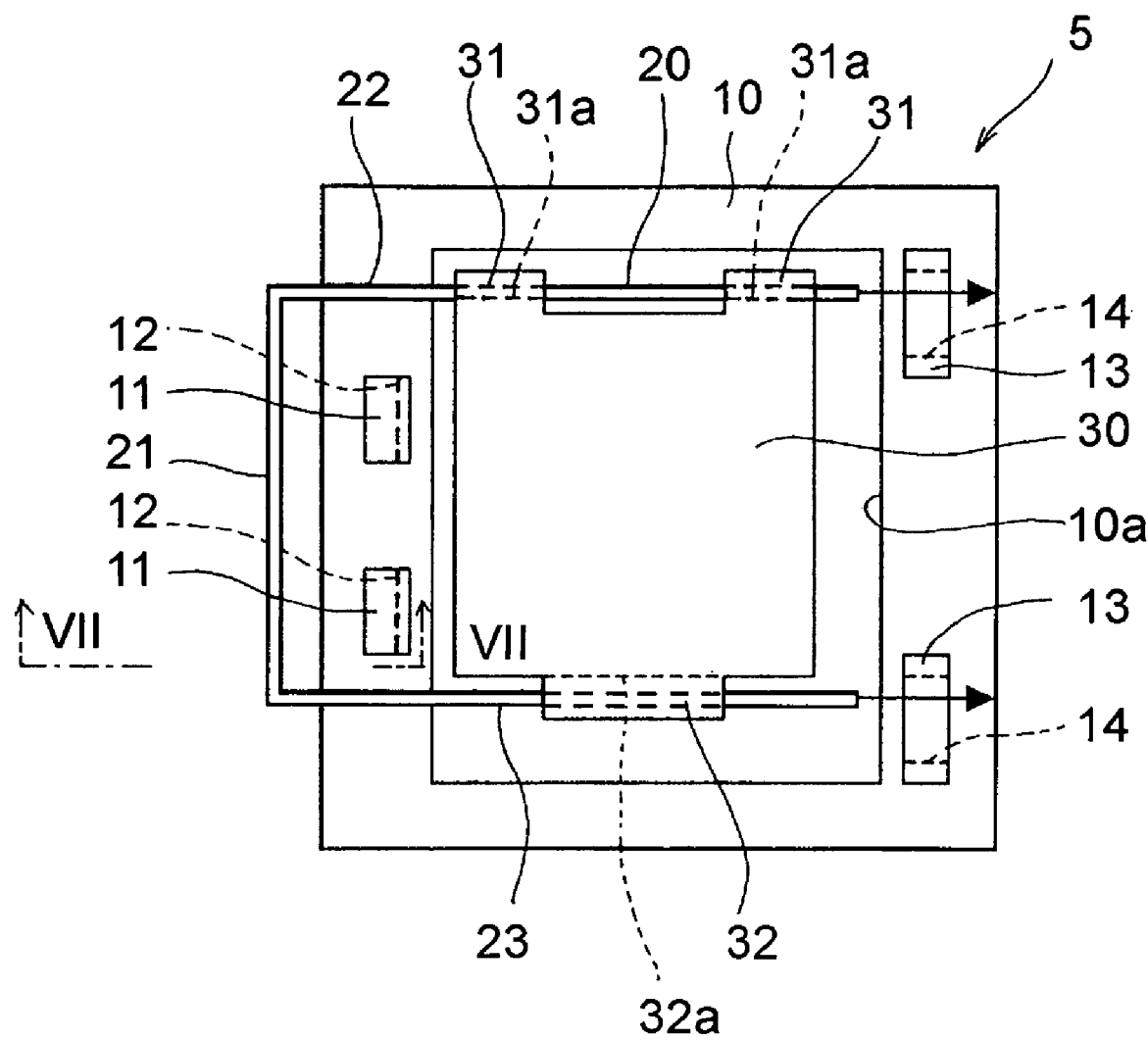
FIG. 6 is a back view of an assembled camera shake correction apparatus with a CCD thereof removed for clarity.
Figure 9:
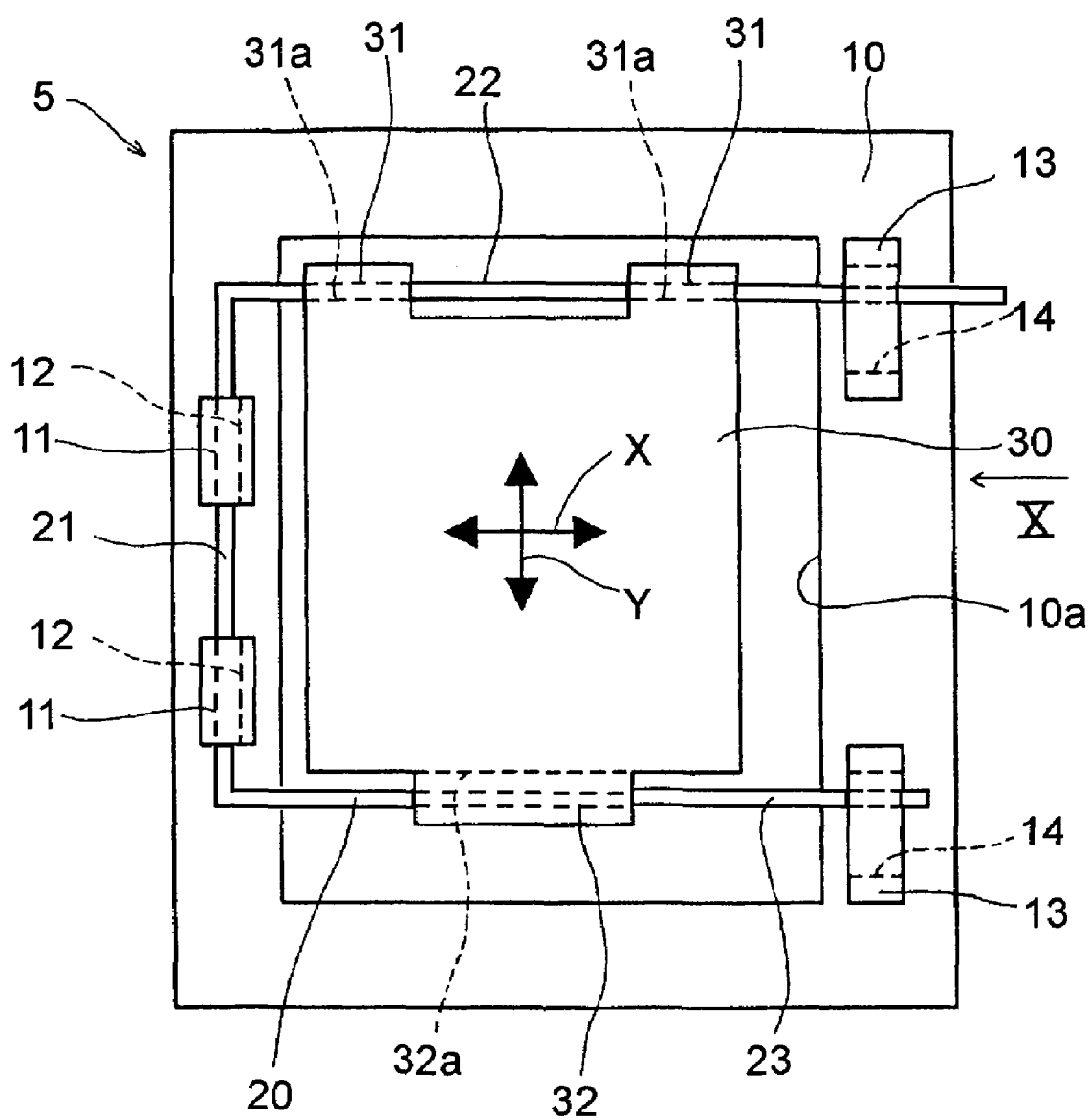
FIG. 9 is a back view of a camera shake correction apparatus with a CCD in an operative position.

In FIGS. 2, 6 and 9, a stationary support base-plate 10 whose shape is square as viewed from the rear, and which is provided at the central portion thereof with a square light receiving hole 10a, is secured to the body 1 of the digital camera by a securing device (not shown), so that the base-plate is normal to the optical axis O and the optical axis O is located at the center of the light receiving hole 10a. Two identical Y-direction guide portions 11 made of a resilient material such as synthetic resin are provided on the left side of the rear surface of the stationary support base-plate 10 and juxtaposed in a Y-direction, indicated by arrows Y in FIG. 2 (upward and downward direction). The Y-direction guide portions 11 are provided with Y-direction guide grooves (Y-direction guide device) 12 which straightly extend therethrough in the Y-direction. As can be seen in FIG. 7, the Y-direction guide grooves 12 each include a guide portion 12a which is circular in cross section and an opening portion 12b which connects the guide portion 12a to the outside. The guide portions 12a provided in the upper and lower Y-direction guide portions 11 are coaxially aligned. The width W1 of the opening portion 12b at the outer end is greater than the width W2 of the opening portion 12b at the connection with the guide portion 12a.

Two identical free-end support portions 13 are juxtaposed in the Y-direction on the right side of the rear surface of the stationary support base-plate 10. The free-end support portions 13 are each provided with a Y-direction elongated hole (Y-direction support device) 14 extending therethrough in an X-direction (lateral direction) indicated by arrows X in FIG. 2 and elongated in the Y-direction.

The Y-direction moving member 20, having the form of rectangular U-shape as viewed from the rear, is formed by bending a metal rod having a circular shape in section, as can be seen in FIGS. 2, 6 and 9. The Y-direction moving member 20 include a Y-direction rod portion 21 which extends in the Y-direction, and X-direction rod portions 22 and 23 which extend from the upper and lower ends of the Y-direction moving member 21 into the right-hand direction in FIGS. 2, 6 and 9. The cross-sectional diameter of the X-direction rod portions 22 and 23 is substantially the same as the width of the Y-direction elongated holes 14 in the forward/rearward direction (i.e., in the optical axis direction).

Figure 8:
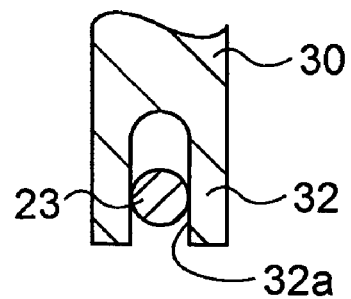
FIG. 8 is an enlarged sectional view taken along the line VIII-VIII in FIG. 2.
Figure 10:
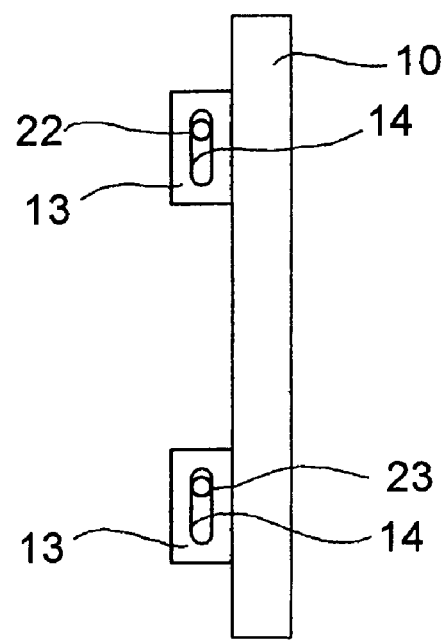
FIG. 10 is a side view of a camera shake correction apparatus with a removed stage plate, viewed from a direction of an arrow X in FIG. 9.

A stage plate (X-direction moving member) 30, which is substantially square in shape as viewed from the rear, is provided on the front surface thereof with the CCD 3. The stage plate 30 is provided on the upper end thereof with a pair of left and right X-direction guide portions 31 projecting therefrom, and on the lower end thereof with a support portion 32 projecting therefrom. The X-direction guide portions 31 are each provided with an X-direction guide hole 31a extending therethrough in the direction X. The sectional shape of the guide holes 31a are substantially the same as that of the X-direction rod portion 22. The support portion 32 is provided with a support groove (rotation prevention hole) 32a extending therethrough in the direction X. The support groove 32a is open at the lower end thereof and has a Y-direction length greater than the diameter (length) of the X-direction rod portion 23 in section, as can be seen in FIG. 8. The width of the support groove 32a in the forward/rearward direction (i.e., in the optical axis direction) is substantially the same as the X-direction rod portion 23.

The camera shake correction apparatus 5 is assembled in the following manner. Namely, the Y-direction moving member 20 is moved toward the stage plate 30 from the left side as viewed in FIGS. 2, 6 and 9, the X-direction rod portion 22 is inserted in the X-direction guide holes 31a of the X-direction guide portions 31, and the X-direction rod portion 23 is inserted in the support groove 32a. Consequently, the stage plate 30 is attached to the Y-direction moving member 20 so as to relatively move in the direction X.

As shown in FIG. 6, the Y-direction moving member 20 connected to the stage plate 30 is linearly moved in the right-hand direction from the left-side in FIG. 6, so that the free ends of the X-direction rod portions 22 and 23 are fitted in the Y-direction elongated holes 14 of the free-end support portions 13 and the Y-direction rod portion 21 is fitted in the opening portions 12b.

When the Y-direction rod portion 21 is fitted in the opening portions 12b, the opening portions 12b are elastically deformed to expand the opening, because the diameter of the Y-direction rod portion 21 is smaller than the outer opening width W1 of the opening portions 12b but larger than the inner opening width W2 thereof. Further movement of the Y-direction rod portion 21 in the right-hand direction in FIG. 6 causes the Y-direction rod portion 21 to be fitted in the guide portions 12a so as not to accidentally come out of the guide portions 12a. At the same time, the opening portions 12b are returned to its original shape due to the elastic restoring force of the Y-direction guide grooves 12. Accordingly, the camera shake correction apparatus is assembled, with the CCD 3 located directly behind the light receiving hole 10a.

As can be understood from the above description, the Y-direction moving member 20 can be easily attached to the Y-direction elongated holes 14 and the guide portions 12a by merely linearly moving the Y-direction moving member 20 in the right-hand direction from the left side with respect to FIGS. 2, 6 and 9. Furthermore, the Y-direction moving member 20 can be easily removed from the Y-direction guide grooves 12 and the Y-direction elongated holes 14 by merely linearly moving the Y-direction moving member 20 in the left-hand direction from the right side with respect to FIGS. 2, 6 and 9, by a small force necessary to elastically deform the opening portions 12b.

Figure 4:
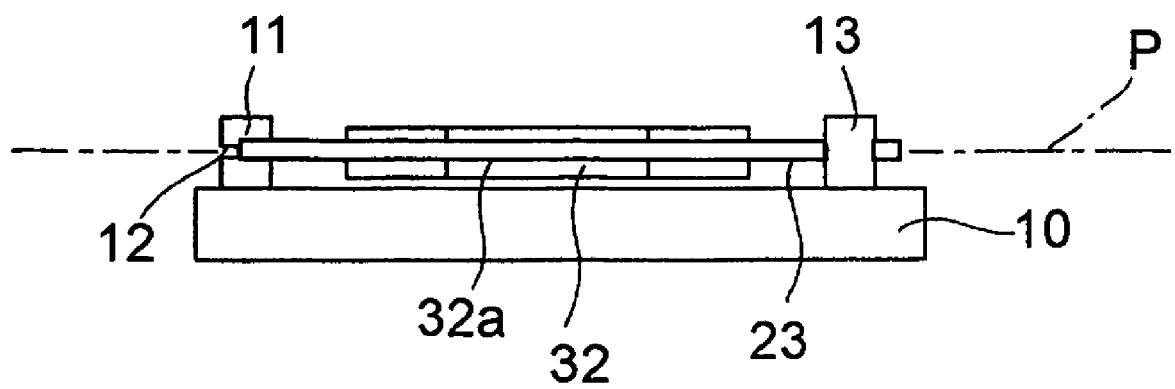
FIG. 4 is a bottom view of a camera shake correction apparatus viewed from a direction indicated by an arrow IV in FIG. 2.
Figure 5:
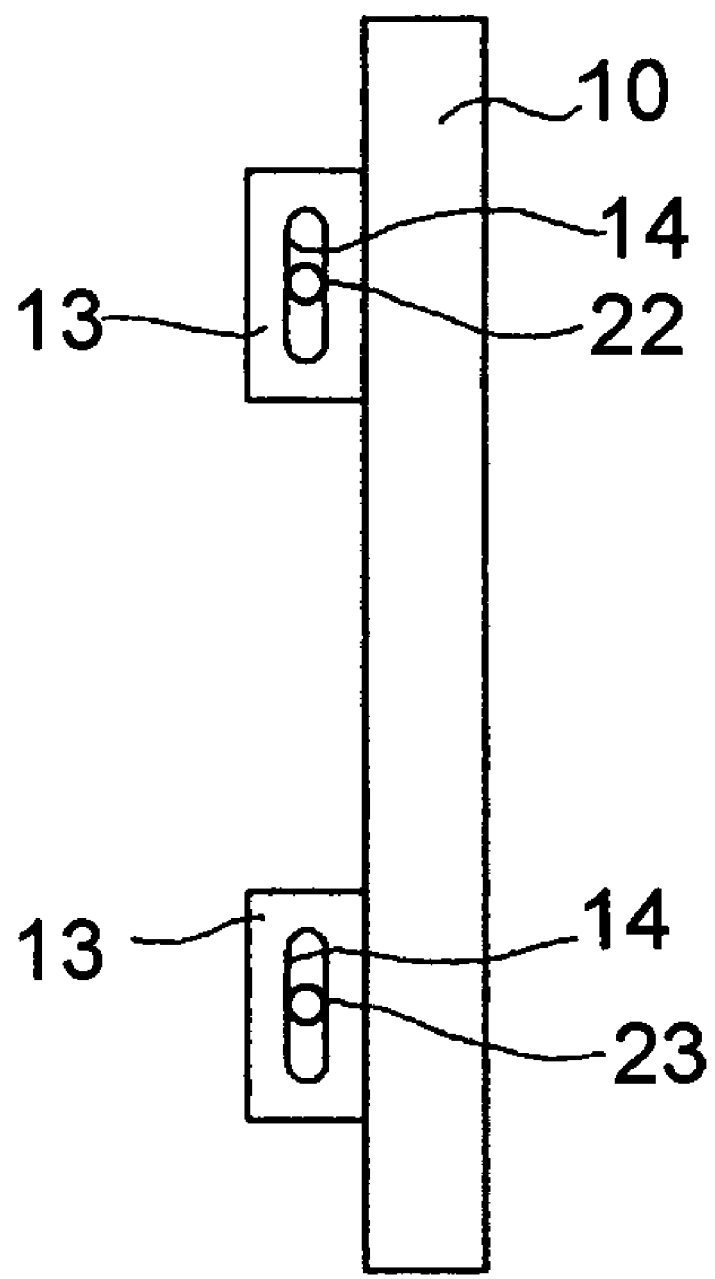
FIG. 5 is a side view of a camera shake correction apparatus with a removed stage plate, viewed from a direction indicated by an arrow V in FIG. 2.

As mentioned above, since the diameter of the X-direction rod portions 22 and 23 is substantially the same as the width of the Y-direction elongated holes 14 in the forward/rearward direction (i.e., in the optical axis direction), no rotation of the Y-direction moving member 20 about the Y-direction rod portion 21 occurs. Consequently, the center axis of the Y-direction moving member 20 always lies in an imaginary X-Y plane P (FIG. 4) parallel with the X-direction and the Y-direction. Moreover, as shown in FIG. 4, the Y-direction guide portions 11, the free-end support portions 13, and the stage plate 30 are also located on the imaginary X-Y plane P.

As shown in FIG. 2, provided in the digital camera 1 are an X-direction actuator AX which linearly and reciprocally moves the stage plate 30 in the direction X and a Y-direction actuator AY which reciprocally and linearly moves the Y-direction moving member 20 in the Y-direction, an oscillation detection sensor S which detects an oscillation of the digital camera 1, and a control circuit (control device) C which sends a drive signal to the X-direction actuator AX or the Y-direction actuator AY, based on oscillation information detected by the oscillation sensor S to thereby drive the X-direction actuator AX or the Y-direction actuator AY in a direction to correct camera shake. The X-direction actuator AX and the Y-direction actuator AY can be constructed from, for example, electric motors. Alternatively, it is also possible to use a piezo-electric element for the X-direction actuator AX and the Y-direction actuator AY, respectively. In this alternative, the stage plate 30 must be biased by a compression spring in a direction opposite to the biasing direction of the piezo-electric elements.

The components of the camera shake correction apparatus 5, apart from the oscillation detection sensor S and the control circuit C, constitute a stage apparatus.

The camera shake correction apparatus 5 operates as follows.

When a picture is taken by the digital camera 1, light transmitted through the lenses L1, L2 and L3 is converged onto the image pickup surface 3a of the CCD 3 through the light receiving hole 10a. When a camera shake correction switch (not shown) of the digital camera 1 is turned ON in a photographing operation, if no camera shake (blur) occurs, the oscillation sensor S does not detect oscillation and, hence, the camera shake correction apparatus 5 is in an inoperative position shown in FIGS. 2 through 5. Conversely, if camera shake occurs, the oscillation sensor S detects the oscillation of the digital camera 1, and the detected oscillation information is sent to the control circuit C. Consequently, drive signals are supplied to the X-direction actuator AX and the Y-direction actuator AY.

For example, if the control circuit C sends a drive signal to the X-direction actuator AX, the linear force in the direction X is applied to the stage plate 30 from the X-direction actuator AX. Consequently, the stage plate 30 is linearly and reciprocally moved in the direction X along the X-direction rod portions 22 and 23 of the Y-direction moving member 20, within a displacement range in which the entirety of the image pickup surface 3a of the CCD 3 is always within the boundaries of the light receiving hole 10a as viewed in the forward/rearward direction (i.e., in the optical axis direction).

If the control circuit C sends a drive signal to the Y-direction actuator AY, the linear force in the Y-direction is applied to the Y-direction moving member 20 from the Y-direction actuator AY. Consequently, the Y-direction moving member 20 (stage plate 30) is linearly and reciprocally moved in the Y-direction along the guide portions 12a of the Y-direction guide-portions 11, within a displacement range in which the entirety of the image pickup surface 3a of the CCD 3 is always within the boundaries of the light receiving hole 10a as viewed in the forward/rearward direction (i.e., in the optical axis direction).

As mentioned above, the reciprocal movement of the stage plate 30 in the directions X and Y causes the position of the CCD 3 secured to the stage plate 30 in the directions X and Y to change in order to correct camera shake.

In the embodiment of the invention discussed above, it is not necessary to provide positioning members which abut against the front and back-sides of the stage plate 30 and which are made of separate pieces from the stage plate 30, the stationary support base-plate 10, and the Y-direction moving member 20. Therefore, not only can the stage apparatus which is simple in structure be manufactured less expensively, the apparatus can also be assembled more easily than a conventional camera shake correction apparatus (stage apparatus).

Since the X-direction rod portion 23 is fitted in the support groove 32a whose length in the Y-direction is greater than the diameter of the X-direction rod portion 23, so that the X-direction rod portion 23 is slidable in the support groove 32a in the Y-direction, the stage plate 30 can be smoothly moved in the direction X relative to the X-direction rod portion 23, even if there is a slight manufacturing error of the X-direction rod portion 23 or the support groove 32a.

Even if the X-direction rod portion 23 is slightly elastically deformed upward or downward, due to an external force from the stage plate 30, a smooth movement of the stage plate 30 can be ensured as long as the fitting relationship between the X-direction rod portion 23 and the support groove 32a is maintained.

Note that if the rigidity of the Y-direction moving member 20 is so high that no or little elastic deformation take place, it is sufficient for the number of the Y-direction guide portions 11 and the free-end support portions 13 to be one each. In this case, the stage plate 30 can be smoothly and linearly moved in the direction X or Y even by a single Y-direction guide portion 11 and a single free-end support portion 13.

A second embodiment of the present invention will be discussed below with reference to FIGS. 11 and 12. Note that in the second embodiment, the elements corresponding to those in the first embodiment are designated with like reference numerals and no duplicate explanation thereof will be given.

Figure 11:
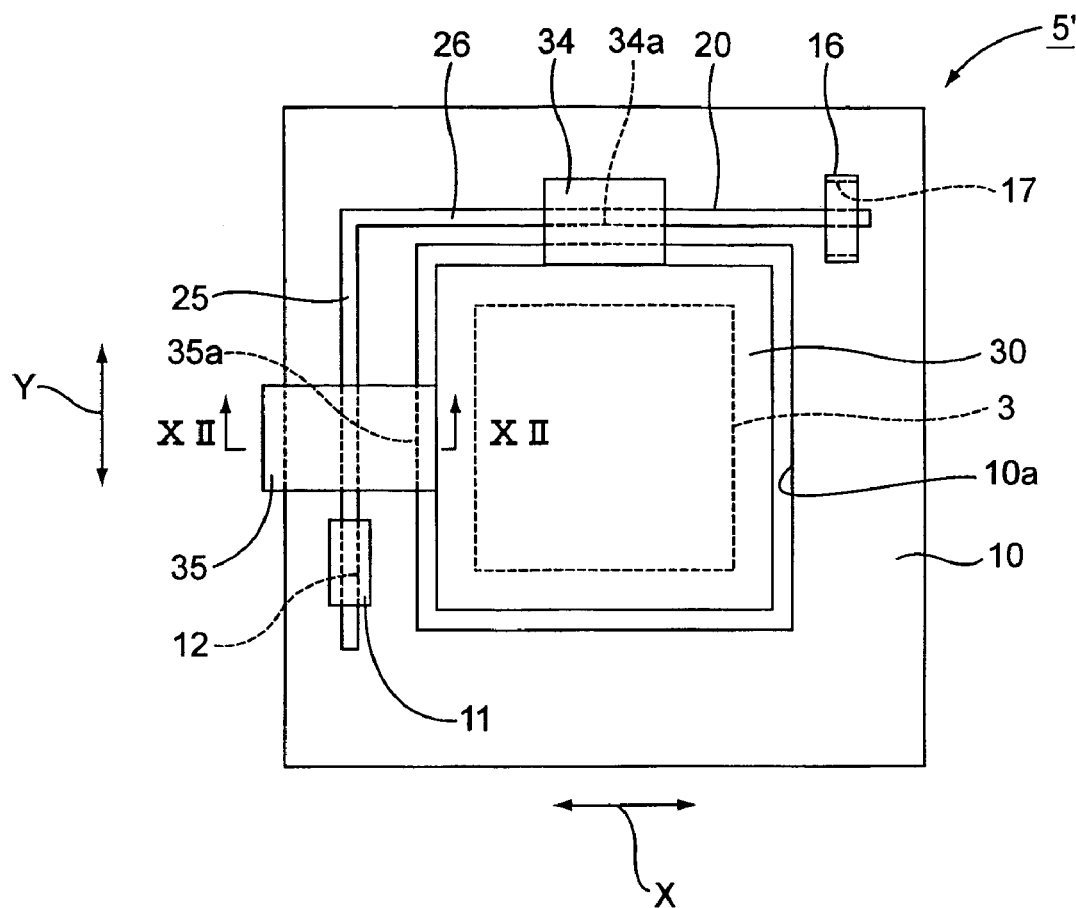
FIG. 11 is a back view of a second embodiment of a stage apparatus according to the present invention.
Figure 12:
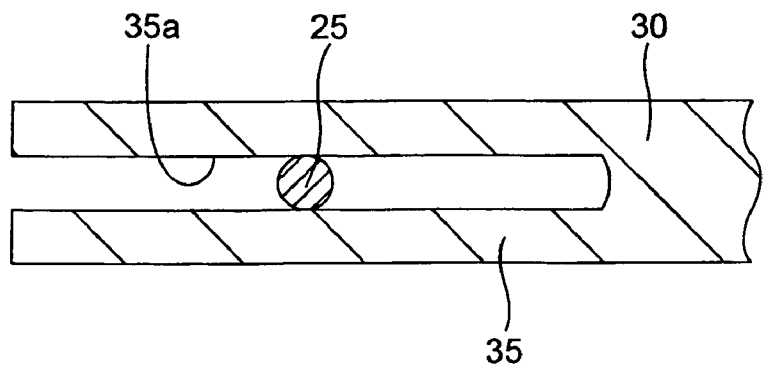
FIG. 12 is an enlarged sectional view taken along the line XII-XII in FIG. 11.

FIG. 11 shows a back view of a camera shake correction apparatus 5' in a second embodiment of the invention, in which the X-direction actuator AX, the Y-direction actuator AY, the control circuit C and the oscillation detection-sensor S are omitted.

The stationary support base-plate 10 in this embodiment is provided, on an upper portion of its rear surface, with a single free-end support portion 16 The free-end support portion 16 is provided with a Y-direction elongated hole (Y-direction support device) 17 which extends therethrough in the direction X and which is elongated in the Y-direction.

The stationary support base-plate 10 is provided, on the left side of the rear surface thereof, with a single Y-direction guide portion 11. The Y-direction moving member 20 is made of an L-shaped metal rod having a circular section and includes a Y-direction rod portion 25 which extends in the Y-direction and an X-direction rod portion 26 which extends from the upper end of the Y-direction rod portion 25 in the right-hand direction as viewed in FIG. 11. The diameter of the X-direction rod portion in section is substantially the same as the width of the Y-direction elongated hole 17 in the forward and rearward direction (i.e., the optical axis direction).

The stage plate 30 is provided on its upper surface with a single X-direction guide portion 34 which is in turn provided with an X-direction guide hole 34a extending therethrough in the X-direction and having a sectional shape substantially the same as the X-direction rod portion 26.

The stage plate 30 is provided, on the left side thereof, with a single support portion 35 which is in turn provided with a support groove (rotation prevention hole) 35a extending therethrough in the Y-direction. The support groove 35a is open at the left end thereof and has an X-direction length greater than the diameter of the Y-direction rod portion 25, and a width in the forward/rearward direction (i.e., in the optical axis direction) that is substantially the same as the diameter of the X-direction rod portion 25, as shown in FIG. 12.

The Y-direction moving member 20 is moved toward the stage plate 30 from the left side in FIG. 11, so that the X-direction rod portion 26 is inserted in the X-direction guide hole 34a of the X-direction guide portion 34 and the Y-direction rod portion 25 is fitted in the support groove 35a. Consequently, the Y-direction moving member 20 is mounted to the stage plate 30 so as to relatively move in the X-direction.

The camera shake correction, apparatus 5' is assembled in the following manner. Namely, the Y-direction moving member 20 integrally connected to the stage plate 30 is linearly moved in the right-hand direction from the left side in FIG. 11, so that the free end of the X-direction rod portion 26 is fitted in the Y-direction elongated hole 17 of the free-end support portion 16 and the Y-direction rod portion 25 is fitted in the guide portion 12a through the opening portion 12b of the Y-direction guide portion 11. Accordingly, the camera shake correction apparatus 5' is assembled, with the CCD 3 located directly behind the light receiving hole 10a.

In the second embodiment, the Y-direction moving member 20 can be easily attached to the Y-direction elongated hole 17 and the guide portion 12a by merely linearly moving the Y-direction moving member 20 in the right-hand direction from the left side, with respect to FIG. 11.

As the diameter of the X-direction rod portion 26 is substantially the same as the width of the Y-direction elongated hole 17 in the forward/rearward direction (i.e., in the,optical axis direction), no rotation of the Y-direction moving member 20 about the Y-direction rod portion 25 takes place. Therefore, the center axis of the Y-direction moving member 20 is always located on an imaginary X-Y plane P (a plane the same as that of the first embodiment shown in FIG. 4) parallel with the X-direction and the Y-direction. Also, the Y-direction guide portion 11, the free-end support portion 16 and the stage plate 30 are located on the imaginary X-Y plane P.

If a force in the X-direction is applied to the stage plate 30 by the X-direction actuator AX, the stage plate 30 is linearly reciprocated in the X-direction along the X-direction rod portion 26 within a displacement range in which the entirety of the image pickup surface 3a of the CCD 3 is always within the boundaries of the light receiving hole 10a as viewed in the forward/rearward direction (i.e., in the optical axis direction) and the engagement between the support groove 35a and the Y-direction rod portion 25 is maintained.

If a linear force in the Y-direction is applied to the stage plate 30 by the Y-direction actuator AY, the Y-direction moving member 20 integrally connected to the stage plate 30 is linearly reciprocated in the Y-direction along the guide portion 12a of the Y-direction guide portion 11 and the Y-direction elongated hole 17, within a displacement range in which the entirety of the image pickup surface 3a of the CCD 3 is always within the boundaries of the light receiving hole 10a as viewed in the forward and backward direction.

In the second embodiment, it is not necessary to provide positioning members which abut against the front and back sides of the stage plate 30 and which are made of separate pieces from the stage plate 30, the stationary support base-plate 10, and the Y-direction moving member 20. Therefore, not only can the stage apparatus, which is very simple in structure, be manufactured less expensively, the apparatus can also be assembled more easily than a conventional camera shake correction apparatus (stage apparatus).

Since the Y-direction rod portion 25 is fitted in the support groove 35a whose length in the X-direction is greater than the diameter of the Y-direction rod portion 25, the Y-direction rod portion 25 is movable in the X-direction within the support groove 35a, so that the stage plate 30 can be smoothly moved in the Y-direction relative to the Y-direction rod portion 25 even if there is a slight manufacturing error in the Y-direction rod portion 25 or in the support groove 35a.

Even if the Y-direction rod portion 25 is slightly elastically deformed in the lateral direction, due to an external force from the stage plate 30, the smooth movement of the stage plate 30 can be ensured as long as the fitting relationship between the Y-direction rod portion 25 and the support groove 35a is maintained.

In the first and second embodiments of the present invention, the CCD 3 is secured to the stage plate 30 so that the camera shake is corrected by moving the CCD 3 in the directions X and Y. Alternatively, it is possible to immovably provide the CCD 3 behind the stage plate 30 and to form a circular mounting hole (not shown) in the stage plate 30, so that a correction lens (not shown) is fitted in the mounting hole. In this alternative, the correction lens can be provided between the lenses L1 and L2 or between the lenses L2 and L3. The correction lens is linearly moved in the directions X and Y to correct a camera shake. Furthermore, the camera shake correction apparatus using the correction lens can be applied to a silver-halide film camera by removing the CCD 3.

It is not always necessary for the Y-direction rod portions 21 (or 25) and the X-direction rod portions 22 (or 26) and 23, which constitute the Y-direction moving member 20, be totally linear. Only the portions of the Y-direction rod portions 21 (or 25) that are fitted in the support grooves 12a (or 35a) need to be linear. Also, only the portions of the X-direction rod portions 22 (or 26) and 23 that are fitted in the corresponding Y-direction elongated hole 14 (or 17), the X-direction guide hole 31a (or 34a) and the support groove 32a need to be linear.

Figure 13:
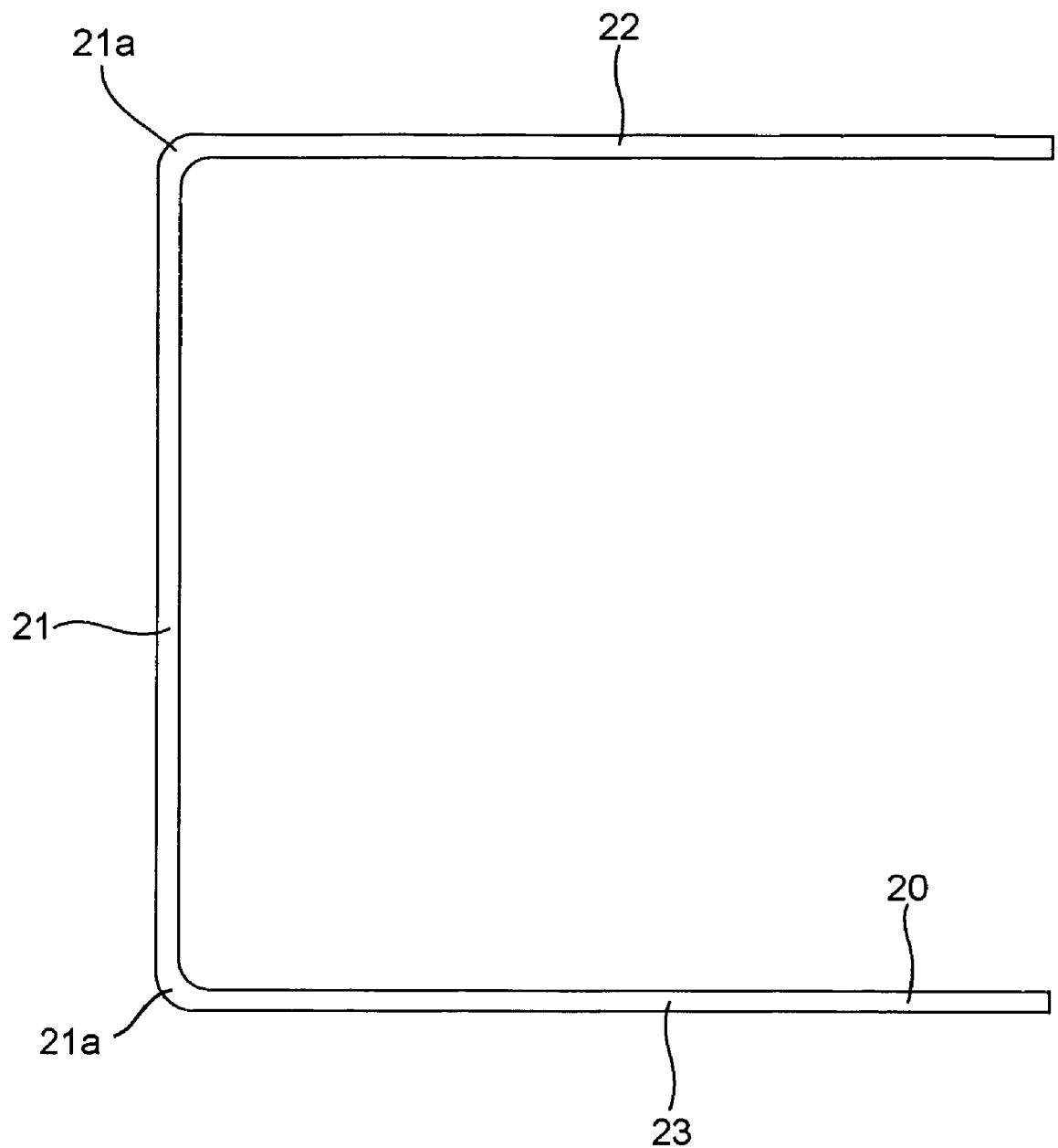
FIG. 13 is a back view of a modification of a Y-direction moving member.

FIG. 13 shows a modification of the Y-direction moving member 20 of the first embodiment. In FIG. 13, the Y-direction rod portion 21 constitutes a linear portion which is fitted in the guide portion 12a when the Y-direction moving member 20 is moved in the Y-direction and extends in the Y-direction. The upper and lower end portions (curved portions 21a) of the Y-direction rod portion 21 that do not fit in the guide portion 12a are curved in an arc as viewed in a front elevational view (i.e., as viewed in FIG. 13). Likewise, the X-direction rod portions 22 and 23 that are fitted in the X-direction guide hole 31a and the support groove 32a when the stage plate 30 is moved in the X-direction are linear in the X-direction, and the left end portions thereof (i.e., the curved portions 21a which connect to the Y-direction rod portion 21) do not fit in the X-direction guide hole 31a and the support groove 32a, respectively.

Although the above discussion has been addressed to a stage apparatus applied to the camera shake correction apparatus 5. The application of the stage apparatus of the present invention is not limited to a camera shake correction apparatus 5. The present invention can be applied to various apparatuses in which the stage apparatus is movable in a plane in two orthogonal directions.

Figure 14:
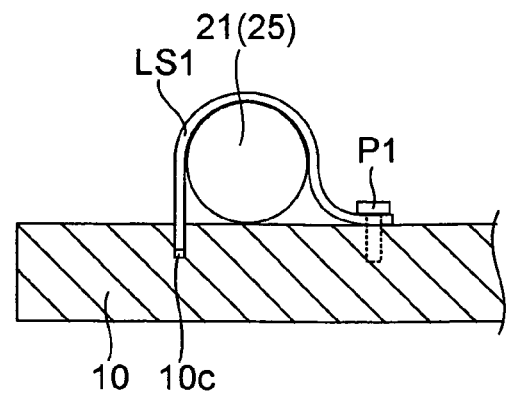
FIG. 14 is an enlarged back view of a modified stationary support plate and a Y-direction elongated member.
Figure 15:
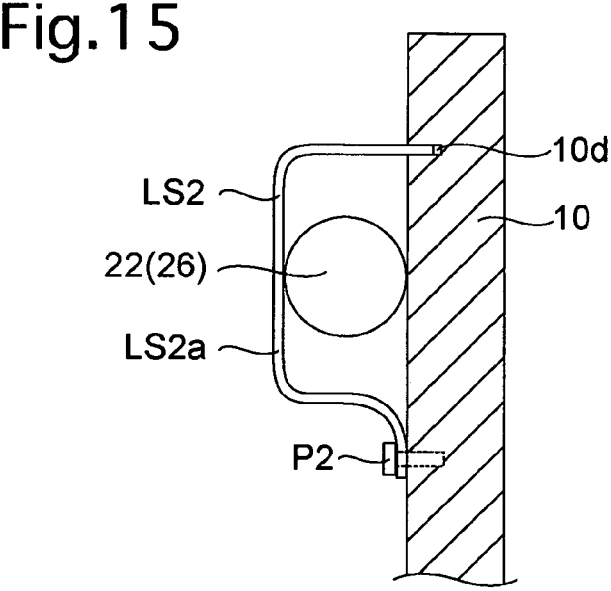
FIG. 15 is an enlarged right-side elevation of a modified stationary support plate and an X-direction elongated member, with the stage plate omitted for clarity.
Figure 15:
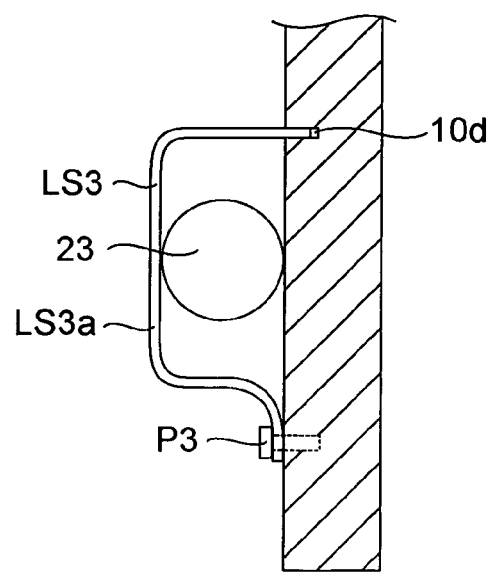

Although the Y-direction guide device is constituted by the Y-direction guide groove 12 and the Y-direction support device is constituted by the Y-direction elongated holes 14 and 17 in the first and second embodiments, these elements (and the Y-direction guide portion 11, the free-end support portion 13, the free-end support portion 16) can be replaced with a leaf springs LS1, LS2 and LS3, respectively, as shown in FIGS. 14 and 15. The leaf spring LS1 is secured to the back surface of the stationary support base-plate 10 in a cantilever fashion by a pin P1 at one end thereof, and the other end thereof is fixedly engaged into a recess 10c formed in the stationary support base-plate 10 to elastically hold the Y-direction rod portion 21 (or Y-direction rod portion 25) between the leaf spring LS1 and the stationary support base-plate 10 so that the Y-direction rod portion 21 (or 25) is slidable only in the Y-direction. The leaf springs LS2 and LS3 are secured to the back surface of the stationary support base-plate 10 in a cantilever fashion by pins P2 and P3, respectively, and the other ends thereof are fixedly engaged into recesses 10d provided in the stationary support base-plate 10. Since the lengths of the leaf springs LS2 and LS3 in the Y-direction are longer than the cross-sectional diameter of the X-direction rod portions 22 (26) and 23, and since the distance between each of the contact portions LS2a and LS3a (which extend parallel to the stationary support base-plate 10) and the stationary support base-plate 10 is the same as the cross-sectional diameter of the X-direction rod portions 22 (26) and 23, if the X-direction rod portions 22 (26) and 23 are resiliently pressed against the stationary support base-plate 10 to be elastically held between the respective leaf springs LS2 and LS3 and the stationary support base-plate 10, the X-direction rod portion 22 (26) and X-direction rod portion 23 become freely slidable in the Y-direction only by a movement amount defined within the leaf springs LS2 and LS3, respectively (in order to prevent the X-direction rod portions 22, 23 and 26 from rotating about the Y-direction rod portions 21 (or 25). Note, in the case where the X-direction rod portion 26 is used, the leaf spring LS3 is not necessary).

Note that if the leaf springs LS1, LS2 and LS3 are used for the Y-direction guide device and the Y-direction support device, as mentioned above, the leaf springs must be rigid enough so that no deformation occurs when a force is applied thereto by the Y-direction rod portions 21 (or 25) or the X-direction rod portions 22 (or 26) and 23.

Obvious changes may be made in the specific embodiments of the present invention described herein, such modifications being within the spirit and scope of the invention claimed. It is indicated that all matter contained herein is illustrative and does not limit the scope of the present invention.

What is claimed is:
1. A stage apparatus, comprising:
a stationary support base-plate;
a Y-direction moving member which is supported on the stationary support base-plate to move in a specific Y-direction; and
an X-direction moving member which is supported on the Y-direction moving member so as to move in an X-direction orthogonal to said Y-direction,
wherein said Y-direction moving member includes a Y-direction rod portion which extends in the Y-direction and an X-direction rod portion which is connected to the Y-direction rod portion and extends in the X-direction, wherein said stationary support base-plate includes a Y-direction guide device for guiding said Y-direction rod portion of said Y-direction moving member so as to slide in the Y-direction, and a Y-direction support device for supporting a free end of said X-direction rod portion so as to allow movement of said X-direction rod portion in said Y-direction, and wherein said X-direction moving member is supported by said Y-direction moving member so as to slide in the X-direction.

2. The stage apparatus according to claim 1, wherein said Y-direction guide device comprises a Y-direction guide hole to guide said Y-direction rod portion so as to slide in the Y-direction, said Y-direction support device comprising a Y-direction elongated hole in which said free end of the X-direction rod portion is supported to allow movement of said X-direction rod portion in the Y-direction and to prevent rotation of the X-direction rod portion about the Y-direction rod portion.

3. The stage apparatus according to claim 1, wherein said Y-direction moving member is provided with a pair of X-direction rod portions, wherein said stationary support base-plate is provided with a pair of said Y-direction elongated holes in which the corresponding X-direction rod portions are supported, wherein said X-direction moving member is supported by said X-direction rod portions so as to slide in the X-direction.

4. The stage apparatus according to claim 3, wherein said X-direction moving member comprises an X-direction guide hole in which one of said X-direction rod portions is linearly movably fitted, and a rotation prevention hole in which the other of said X-direction rod portions is fitted so as to relatively move in the X-direction and so as not to rotate about said one X-direction rod portion.

5. The stage apparatus according to claim 4, wherein the length of said rotation prevention hole in the Y-direction is longer than the length of said other X-direction rod portion in section in the Y-direction.

6. The stage apparatus according to claim 1, wherein said Y-direction moving member comprises a single X-direction rod portion;

wherein said X-direction moving member is provided with an X-direction guide hole in which the X-direction rod portion is linearly movably fitted, and a rotation prevention hole in which the Y-direction rod portion is fitted so as to relatively move in the Y-direction and so as not to rotate about said one X-direction rod portion.

7. The stage apparatus according to claim 6, wherein the length of the rotation prevention hole in the X-direction is longer than the length of the Y-direction rod portion in section in the X-direction.

8. The stage apparatus according to claim 2, wherein said Y-direction guide hole of the stationary support base-plate comprises an opening portion in which the Y-direction rod portion is removably inserted from a direction perpendicular to the direction of an extension of the Y-direction rod portion, so that when the Y-direction rod portion is inserted in the Y-direction guide hole through the opening portion, the free end of the X-direction rod portion is fitted in the Y-direction elongated hole.

9. The stage apparatus according to claim 1, comprising a Y-direction actuator which drives the Y-direction moving member which carries thereon the X-direction moving member in the Y-direction, and an X-direction actuator which drives the X-direction moving member on the Y-direction moving member in the X-direction.

10. A camera shake correction apparatus using a stage apparatus according to claim 9, comprising:
a camera in which the stage apparatus is built;
an image pickup device which is secured to a front surface of the X-direction moving member and which has an image pickup surface on an image forming surface of an optical system of the camera;
an oscillation detection sensor which detects an oscillation of the camera; and
a control device for driving said X-direction actuator and said Y-direction actuator to correct a camera shake, based on oscillation information detected by the oscillation detection sensor.

11. A camera shake correction apparatus using a stage apparatus according to claim 9, comprising:
a camera in which the stage apparatus is built;
a camera shake correcting lens secured to the X-direction moving member and located in front of the image pickup surface, said camera shake correcting lens being perpendicular to an optical axis of the optical system of the camera;
an oscillation detection sensor which detects an oscillation of the camera; and
a control device for driving the X-direction actuator or Y-direction actuator to correct a camera shake, based on oscillation information detected by the oscillation detection sensor.

* * * * *